(12) United States Patent
Yagi et al.

(10) Patent No.: US 7,060,346 B2
(45) Date of Patent: Jun. 13, 2006

(54) RESIN SHEETS, PROCESSES FOR PRODUCING THE SAME, AND LIQUID CRYSTAL DISPLAYS

(75) Inventors: Nobuyoshi Yagi, Osaka (JP); Toshiyuki Umehara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 412 days.

(21) Appl. No.: 10/002,300

(22) Filed: Dec. 5, 2001

(65) Prior Publication Data

US 2002/0068134 A1   Jun. 6, 2002

(30) Foreign Application Priority Data

| Dec. 6, 2000 | (JP) | ............................. | 2000-370808 |
| Dec. 6, 2000 | (JP) | ............................. | 2000-370832 |
| Dec. 6, 2000 | (JP) | ............................. | 2000-370852 |
| Sep. 20, 2001 | (JP) | ............................. | 2001-287327 |
| Sep. 20, 2001 | (JP) | ............................. | 2001-287444 |

(51) Int. Cl.
  *B32B 5/16* (2006.01)
  *B32B 27/38* (2006.01)
  *B32B 27/40* (2006.01)
  *C09K 19/00* (2006.01)

(52) U.S. Cl. ...................... 428/220; 428/1.1; 428/332; 428/413; 428/414; 428/423.1

(58) Field of Classification Search ............... 428/323, 428/413, 414, 423.1, 1.1, 1.53, 1.6, 220, 428/332, 411.1
See application file for complete search history.

(56) References Cited

U.S. PATENT DOCUMENTS

| 5,747,152 | A | * | 5/1998 | Oka et al. ................... 428/323 |
| 6,268,961 | B1 | * | 7/2001 | Nevitt et al. ................ 359/488 |
| 6,495,253 | B1 | * | 12/2002 | Koyama et al. ............. 428/343 |
| 6,500,518 | B1 | * | 12/2002 | Sugawa et al. ............. 428/141 |
| 6,573,958 | B1 | * | 6/2003 | Takahashi et al. ............ 349/86 |

FOREIGN PATENT DOCUMENTS

| EP | 0 864 910 A1 | 9/1998 |
| JP | 7-35913 A | 2/1995 |
| JP | 9-304607 | 11/1997 |
| JP | 2000-301557 A | 10/2000 |

* cited by examiner

*Primary Examiner*—Sheeba Ahmed
(74) *Attorney, Agent, or Firm*—Sughrue Mion, PLLC

(57) ABSTRACT

Resin sheets which are thin and lightweight and have an antiglare function for preventing the so-called ghost phenomenon in which an illuminating light, such as fluorescent light or sunlight, or part of the surrounding objects, e.g., the keyboarder, is reflected on the display and/or a light-diffusing function for preventing the glittering attributable to an illuminating light or to the built-in backlight in the liquid crystal display; processes for producing the resin sheets; and liquid crystal displays using the resin sheets. One of the resin sheets comprises a gas barrier layer, a base layer, and two hard coat layers respectively as the outermost layers, wherein one of the hard coat layers has recesses and protrusions on the outer surface thereof and at least one of the hard coat layers contains transparent particles.

8 Claims, 5 Drawing Sheets

RESIN SHEETS, PROCESSES FOR PRODUCING THE SAME, AND LIQUID CRYSTAL DISPLAYS

FIELD OF THE INVENTION

The present invention relates to a resin sheet which prevents ghosts and glittering and has excellent antiglare and light-diffusing properties, a resin sheet which prevents glittering and has excellent light-diffusing properties, a resin sheet which prevents ghosts and has excellent antiglare properties, processes for producing the resin sheets, liquid crystal displays using the resin sheets, and organic electroluminescent displays using the resin sheets.

DESCRIPTION OF THE RELATED ART

In displays such as liquid crystal displays, a technique for improving visibility has been known in which a light-diffusing sheet containing transparent particles is bonded to the viewing side of the liquid crystal cell to prevent the glittering attributable to an illuminating light or to the built-in backlight in the liquid crystal display. A technique is also known in which an antiglare sheet having recesses and protrusions on a surface thereof is bonded to the viewing side of a liquid crystal cell to thereby prevent the so-called ghost phenomenon in which an illuminating light, such as fluorescent light or sunlight, or part of the surrounding objects, e.g., the keyboarder, is reflected on the display.

However, from the standpoint of reducing the thickness and weight of liquid crystal displays, investigations are being made on the impartation of a light-diffusing function or antiglare function to a resin sheet in place of bonding a light-diffusing sheet or antiglare sheet to the viewing side of a liquid crystal cell.

SUMMARY OF THE INVENTION

One object of the invention is to provide resin sheets which are thin and lightweight and have an antiglare function for preventing the so-called ghost phenomenon in which an illuminating light, such as fluorescent light or sunlight, or part of the surrounding objects, e.g., the keyboarder, is reflected on the display and/or a light-diffusing function for preventing the glittering attributable to an illuminating light or to the built-in backlight in the liquid crystal display.

Another object of the invention is to provide processes for producing the resin sheets.

Still another object of the invention is to provide liquid crystal displays using the resin sheets.

Further object of the invention is to provide organic electroluminescent displays using the resin sheets.

The invention provides, according to the first aspect thereof, a resin sheet comprising a gas barrier layer, a base layer, and two hard coat layers respectively as the outermost layers, wherein one of the hard coat layers has recesses and protrusions on the outer surface (exposed surface) thereof and at least one of the hard coat layers contains transparent particles.

This invention further provides a resin sheet comprising a gas barrier layer, a base layer, and one hard coat layer as an outermost layer, wherein the hard coat layer has recesses and protrusions on the outer surface thereof and contains transparent particles.

In the resin sheets described above, the surface having recesses and protrusions preferably has a surface roughness of from 80 to 500 nm and a peak-to-valley distance of from 20 to 80 μm.

The transparent particles preferably are such spherical particles that the difference in refractive index between the spherical particles and the matrix resin constituting the hard coat layer is from 0.03 to 0.10.

The base layer preferably comprises an epoxy resin, and the hard coat layers preferably comprise a urethane resin.

According to the first aspect, there are also provided: a process for producing the resin sheet which includes the step of transferring the shape of recesses formed in a support to thereby form recesses and protrusions on a surface of a hard coat layer; and a liquid crystal display which uses the resin sheet according to this aspect of the invention.

The invention further provides, according to the second aspect thereof, a resin sheet comprising a gas barrier layer, a base layer, and two hard coat layers respectively as the outermost layers, wherein at least one of the hard coat layers contains transparent particles.

This invention furthermore provides a resin sheet comprising a gas barrier layer, a base layer, and one hard coat layer as an outermost layer, wherein the hard coat layer contains transparent particles.

In the resin sheets described above, the transparent particles preferably are such spherical particles that the difference in refractive index between the spherical particles and the matrix resin constituting the hard coat layer is from 0.03 to 0.10.

The base layer preferably comprises an epoxy resin, and the hard coat layers preferably comprise a urethane resin.

According to the second aspect, there is also provided a liquid crystal display which uses the resin sheet according to this aspect of the invention.

The invention furthermore provides, according to the third aspect thereof, a resin sheet comprising a gas barrier layer, a base layer, and one hard coat layer as an outermost layer, wherein the hard coat layer has recesses and protrusions on the outer surface thereof.

In the resin sheet described above, the surface having recesses and protrusions preferably has a surface roughness of from 80 to 500 nm and a peak-to-valley distance of from 20 to 80 μm.

The base layer preferably comprises an epoxy resin, and the hard coat layer preferably comprises a urethane resin.

According to the third aspect, there are also provided: a process for producing the resin sheet which includes the step of transferring the shape of recesses formed in a support to thereby form recesses and protrusions on a surface of a hard coat layer; and a liquid crystal display which uses the resin sheet according to this aspect of the invention.

DESCRIPTION OF THE REFERENCE NUMERALS

Figure 1:
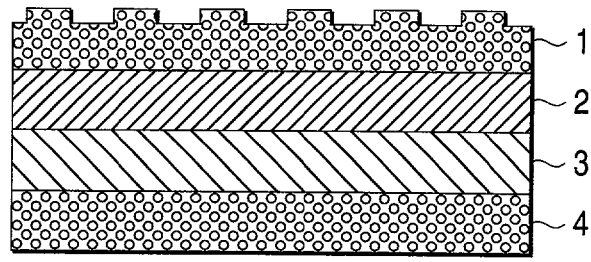
FIG. 1 is a diagrammatic sectional view of one embodiment of the resin sheets according to the invention.

1: hard coat layer having recesses and protrusions and containing particles
2: base layer
3: gas barrier layer
4: hard coat layer containing particles
5: hard coat layer
6: hard coat layer having recesses and protrusions
7: endless belt (substrate)
8: die for base layer formation
9: heater
10: driving drum
11: subsidiary drum
12: base layer
13: die for hard coat layer formation
14: UV curing device
15: die for gas barrier layer formation
16: gas barrier layer
17: hard coat layer
18: tape for edge reinforcement
19: even surface casting plate
20: surface-processed casting plate
21: sealing material
22: spacer for gap regulation
23: black base layer

DETAILED DESCRIPTION OF THE INVENTION

One of the resin sheets according to the first aspect of the invention comprises a gas barrier layer, a base layer, and two hard coat layers respectively as the outermost layers, wherein one of the hard coat layers has recesses and protrusions on the outer surface thereof and at least one of the hard coat layers contains transparent particles.

The term "at least one of the hard coat layers contains transparent particles" includes: the case where of the two hard coat layers, only the layer having recesses and protrusions on the surface contains transparent particles; the case where of the two hard coat layers, only the layer not having recesses and protrusions on the surface contains transparent particles; and the case where both the hard coat layer having recesses and protrusions on the surface and the hard coat layer not having recesses and protrusions on the surface contain transparent particles.

Figure 2:
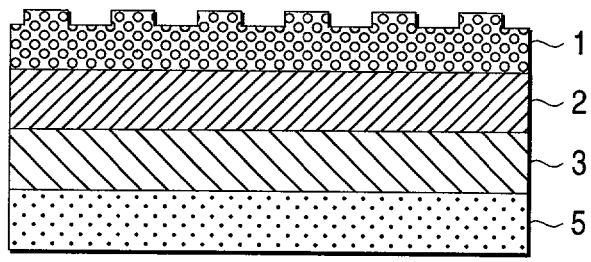
FIG. 2 is a diagrammatic sectional view of another embodiment of the resin sheets according to the invention.
Figure 3:
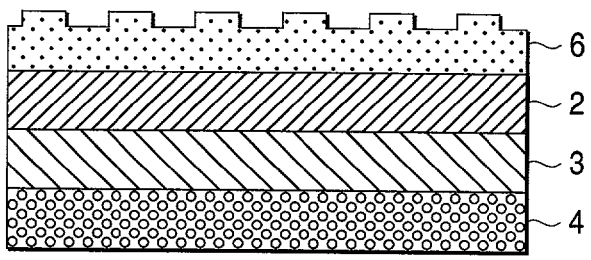
FIG. 3 is a diagrammatic sectional view of still another embodiment of the resin sheets according to the invention.

In this resin sheet, the sequence of superposition of the base layer and gas barrier layer is not particularly limited. Namely, the resin sheet provided by this aspect of the invention can be one comprising, from an outermost side, a hard coat layer, a gas barrier layer, a base layer, and a hard coat layer, or one comprising, from an outermost side, a hard coat layer, a base layer, a gas barrier layer, and a hard coat layer. Embodiments of the resin sheet described above are shown in FIGS. 1 to 3.

The other of the resin sheets according to the first aspect of the invention comprises a gas barrier layer, a base layer, and one hard coat layer as an outermost layer, wherein the hard coat layer has recesses and protrusions on the outer surface thereof and contains transparent particles.

Figure 4:
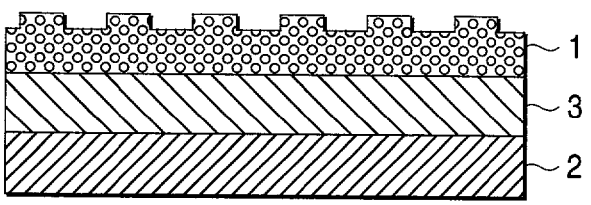
FIG. 4 is a diagrammatic sectional view of a further embodiment of the resin sheets according to the invention.

In this resin sheet also, the sequence of superposition of the base layer and gas barrier layer is not particularly limited. Namely, this resin sheet according to the first aspect of the invention can be one comprising, from an outermost side, a hard coat layer, a gas barrier layer, and a base layer, or one comprising, from an outermost side, a hard coat layer, a base layer, and a gas barrier layer. It is, however, preferred that the gas barrier layer be not an outermost layer, because the gas barrier layer may be inferior to the hard coat layer and base layer in impact resistance and chemical resistance. Namely, the resin sheet comprising, from an outermost side, a hard coat layer, a gas barrier layer, and a base layer is more preferred. One embodiment of the resin sheet described above is shown in FIG. 4.

Examples of materials usable for forming the hard coat layers in the invention include urethane resins, acrylic resins, polyester resins, poly (vinyl alcohol) resins such as poly (vinyl alcohol) and ethylene/vinyl alcohol copolymers, vinyl chloride resins, and vinylidene chloride resins.

Also usable for forming the resin layers are polyarylate resins, sulfone resins, amide resins, imide resins, polyethersulfone resins, polyetherimide resins, polycarbonate resins, silicone resins, fluororesins, polyolefin resins, styrene resins, vinylpyrrolidone resins, cellulosic resins, acrylonitrile resins, and the like. Preferred of these resins are urethane resins, in particular, a urethane acrylate. An appropriate blend or the like of two or more resins can also be used for forming the resin layers.

Examples of materials usable for forming the gas barrier layer in the invention include materials having low oxygen permeability, such as vinyl alcohol polymers, e.g., poly (vinyl alcohol), partially saponified poly(vinyl alcohol)s, and ethylene/vinyl alcohol copolymers, polyacrylonitrile, and poly(vinylidene chloride). However, vinyl alcohol polymers are especially preferred from the standpoint of high gas barrier properties.

The thickness of the gas barrier layer is preferably from 2 to 10 μm, more preferably from 3 to 5 μm. If the thickness of the organic gas barrier layer is smaller than 2 μm, a sufficient gas barrier function cannot be imparted. If it exceeds 10 μm, the resin sheet comes to have an increased yellowness index (YI).

Examples of resins which can be spread for forming the base layer include thermoplastic resins such as polycarbonates, polyarylates, polyethersulfones, polysulfones, polyesters, poly (methyl methacrylate), polyetherimides or polyamides, and thermosetting resins such as epoxy resins, unsaturated polyesters, poly(diallyl phthalate) or poly (isobornyl methacrylate). These resins may be used alone or in combination of two or more thereof, or may be used as a copolymer or mixture with other ingredient(s). Most preferred of these resins are epoxy resins.

Examples of the epoxy resins usable for forming an epoxy resin layer in the invention include the bisphenol types, such as bisphenol A, bisphenol F, bisphenol S types and hydrogenated epoxy resins derived from these, the novolac types such as phenol-novolac and cresol-novolac types, the nitrogen-containing cyclic types such as triglycidyl isocyanurate and hydantoin types, the alicyclic type, the aliphatic type, the aromatic types such as naphthalene type, the glycidyl ether type, the low water absorption types such as biphenyl type, the dicyclo type, the ester type, the etherester type, and modifications of these. These resins may be used alone or in combination of two or more thereof. Preferred of those various epoxy resins from the standpoints of discoloration prevention etc., are bisphenol A epoxy resins, alicyclic epoxy resins, and triglycidyl isocyanurate type epoxy resins.

From the standpoint of obtaining a resin sheet satisfactory in flexibility, strength, and other properties, it is generally preferred to use such an epoxy resin which has an epoxy equivalent of from 100 to 1,000 and gives a cured resin having a softening point of 120° C. or lower. From the standpoint of obtaining an epoxy resin-containing liquid excellent in applicability, spreadability into sheet, etc., it is preferred to use a two-pack type resin which is liquid at temperatures not higher than the application temperature, in particular at room temperature.

A hardener and a hardening accelerator can be suitably incorporated into the epoxy resins. Furthermore, various conventional additives such as an antioxidant, modifier, surfactant, dye, pigment, discoloration inhibitor, and ultraviolet absorber can be suitably incorporated according to need.

The hardener is not particularly limited, and one or more suitable hardeners can be used according to the epoxy resin to be used. Examples of the hardener include organic acid compounds such as tetrahydrophthalic acid, methyltetrahydrophthalic acid, hexahydrophthalic acid and methylhexahydrophthalic acid, and amine compounds such as ethylenediamine, propylenediamine, diethylenetriamine, triethylenetetramine, amine adducts of these, m-phenylenediamine, diaminodiphenylmethane and diaminodiphenyl sulfone.

Other examples of the hardener include amide compounds such as dicyandiamide and polyamides, hydrazide compounds such as dihydrazide, and imidazole compounds such as methylimidazole, 2-ethyl-4-methylimidazole, ethylimidazole, isopropylimidazole, 2,4-dimethylimidazole, phenylimidazole, undecylimidazole, heptadecylimidazole, and 2-phenyl-4-methylimidazole.

Examples of the hardener further include imidazoline compounds such as methylimidazoline, 2-ethyl-4-methylimidazoline, ethylimidazoline, isopropylimidazoline, 2,4-dimethylimidazoline, phenylimidazoline, undecylimidazoline, heptadecylimidazoline, and 2-phenyl-4-methylimidazoline, and further include phenol compounds, urea compounds, and polysulfide compounds.

Acid anhydride compounds also are included in examples of the hardener. Such acid anhydride hardeners can be advantageously used from the standpoints of discoloration prevention, etc. Examples thereof include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride, and chlorendic anhydride.

Especially preferred are acid anhydride hardeners which are colorless to light-yellow and have a molecular weight of from about 140 to 200, such as phthalic anhydride, tetrahydrophthalic anhydride, hexahydrophthalic anhydride, and methylhexahydrophthalic anhydride.

In the case where an acid anhydride is used as a hardener, an epoxy resin and this hardener are mixed in such a proportion that the amount of the acid anhydride is preferably from 0.5 to 1.5 equivalents, more preferably from 0.7 to 1.2 equivalents, per equivalent of the epoxy groups of the epoxy resin. If the acid anhydride is used in an amount smaller than 0.5 equivalents, the cured resin tends to have an impaired hue. If the acid anhydride is used in an amount exceeding 1.5 equivalents, the cured resin tends to have reduced moisture resistance. In the case of using one or more other hardeners, the range of the amount thereof to be used may be the same as in the case described above.

Examples of the hardening accelerator include tertiary amines, imidazole compounds, quaternary ammonium salts, organic metal salts, phosphorus compounds, and urea compounds. Especially preferred of these are tertiary amines, imidazole compounds, and phosphorus compounds. These compounds can be used alone or in combination of two or more thereof.

The amount of the hardening accelerator to be incorporated is preferably from 0.05 to 7.0 parts by weight, more preferably from 0.2 to 3.0 parts by weight, per 100 parts by weight of the epoxy resin. If the amount of the hardening accelerator incorporated is smaller than 0.05 parts by weight, a sufficient hardening-accelerating effect cannot be obtained. If the amount thereof exceeds 7.0 parts by weight, there is a possibility that the cured resin might discolor.

Examples of the antioxidant include conventional antioxidants such as phenol compounds, amine compounds, organosulfur compounds, and phosphine compounds.

Examples of the modifier include conventional modifiers such as glycols, silicones, and alcohols.

The surfactant is added for the purpose of obtaining an epoxy resin sheet having a smooth surface when the epoxy resin is formed into a sheet by flow casting and cured while in contact with air. Examples of the surfactant include silicone, acrylic, and fluorochemical surfactants. Especially preferred are silicone surfactants.

In the first aspect of the invention, when a hard coat layer has recesses and protrusions, an antiglare function is imparted to the resin sheet. The hard coat layer having recesses and protrusions in this aspect of the invention preferably has a surface roughness (Ra) of from 80 to 500 nm. If the surface roughness (Ra) of the hard coat layer having recesses and protrusions is lower than 80 nm or higher than 500 nm, a sufficient antiglare function cannot be imparted. The term "surface roughness" as used herein means the "arithmetic mean roughness Ra" as provided for in JIS B 0601.

The hard coat layer having recesses and protrusions in this aspect of the invention preferably has a peak-to-valley distance of from 20 to 80 µm. If the peak-to-valley distance of the hard coat layer is smaller than 20 µm or larger than 80 µm, a sufficient antiglare function cannot be imparted. The term "peak-to-valley distance" as used herein means the "mean distance between recesses and protrusions Sm" as provided for in JIS B 0601.

In this aspect of the invention, when the hard coat layer as an outermost layer contains transparent particles, a light-diffusing function is imparted to the resin sheet. Examples of the transparent particles for use in this invention include particles of inorganic materials such as glasses and silica and particles of organic materials such as acrylic resins, polyester resins, epoxy resins, melamine resins, urethane resins, polycarbonate resins, polystyrene resins, silicone resins, benzoguanamine resins, melamine/benzoguanamine condensates, and benzoguanamine/formaldehyde condensates. Preferred are spherical particles having such a refractive index that the difference in refractive index between the spherical particles and the matrix resin constituting the hard coat layer is in the range of from 0.03 to 0.10. If the difference in refractive index between the spherical particles and the matrix resin is smaller than 0.03 or larger than 0.10, a sufficient light-diffusing function cannot be imparted.

The transparent particles preferably have a particle diameter of from 0.5 to 30 µm. Particle diameters thereof smaller than 0.5 µm are undesirable in that the result is insufficient light diffusion, while particle diameters thereof larger than 30 µm are undesirable in that the result is uneven light diffusion.

The proportion of the transparent particles to the hard coat layer is preferably from 1 to 50% by volume. This proportion by volume can be defined as [(volume of the transparent particles) (volume of the hard coat layer)]×100. The "volume of the hard coat layer" herein means the volume of the hard coat layer including the transparent particles. If the proportion of the transparent particles to the hard coat layer is lower than 1% or higher than 50%, a sufficient light-diffusing function cannot be imparted.

A process for producing the resin sheets according to this aspect of the invention includes the step of transferring the shape of recesses formed in a support to thereby form recesses and protrusions on a surface of a hard coat layer.

The support is usually in the form of a belt or plate. Examples thereof include an endless belt for flow casting and a flat molding plate for casting.

In order for the support to give a hard coat layer having recesses and protrusions, the support preferably has a surface roughness (Ra) of from 80 to 500 nm and a peak-to-valley distance of from 20 to 80 µm.

In the flow casting method, a resin solution for hard-coat layer formation is applied to a support having recesses and protrusions and then dried to form a hard coat layer. Thereon are superposed a gas barrier layer and a base layer. The resulting multilayer structure is peeled from the support to thereby obtain a resin sheet in which the hard coat layer has recesses and protrusions formed thereon.

When another hard coat layer is formed on that multilayer structure on the side opposite the support side, then a resin sheet having two hard coat layers is obtained. In this case, the hard coat layer thus formed has no recesses and protrusions.

In this aspect of the invention, when a resin solution for hard coat layer formation which contains transparent particles is applied and then dried, a hard coat layer containing transparent particles can be formed.

In the casting method, a resin solution for hard coat layer formation is first applied to a casting plate having a surface with recesses and protrusions and to a casting plate having an even surface, and the solution applied is dried to form hard coat layers. Subsequently, a liquid containing a resin for gas barrier layer formation is applied to either of the two casting plates and then dried to form a gas barrier layer. These two casting plates are assembled through a spacer and a sealing material so that the resin-coated sides face each other. Subsequently, a liquid containing a resin for base layer formation is injected into the space between the casting plates and cured to form a base layer. The resulting multilayer resin structure is peeled from the two casting plates. Thus, a resin sheet can be obtained in which one of the hard coat layers has recesses and protrusions formed by the transfer of the shape of recesses formed in one of the supports.

In this casting method also, a hard coat layer containing transparent particles can be formed by incorporating transparent particles into a resin solution for hard coat layer formation and applying and drying the solution.

The casting plate having recesses and protrusions for use in the casting method also preferably has a surface roughness (Ra) of from 80 to 500 nm and a peak-to-valley distance of from 20 to 80 µm.

Figure 10:
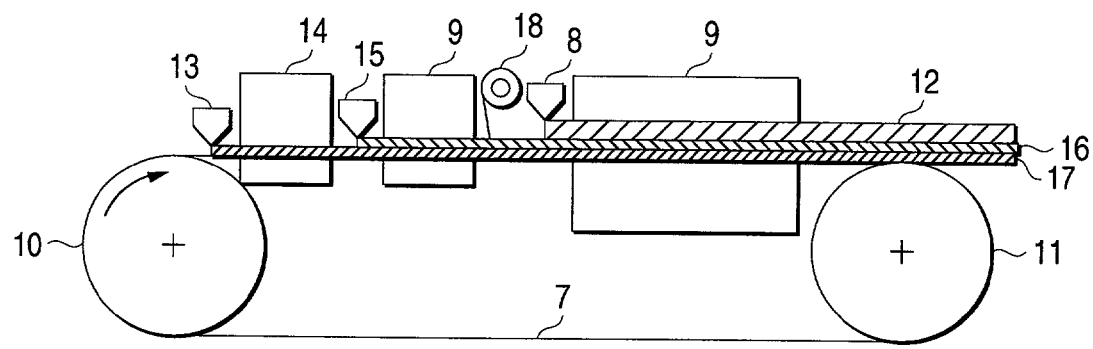
FIG. 10 is a diagrammatic view illustrating a process for producing a resin sheet by the flow casting method.

An embodiment of one of the above-described processes according to the invention is illustrated in FIG. 10. In the process shown in FIG. 10, a resin sheet is continuously produced by the flow casting method using an endless belt as a support.

In the flow casting method shown in FIG. 10, a support comprising an endless belt 7 is caused to run through a driving drum 10 and a subsidiary drum 11 at a constant speed of, e.g., from 0.1 to 50 m/min, preferably from 0.2 to 5 m/min. While the belt 7 is thus kept being run, a resin solution for hard coat layer formation and a liquid containing a resin for gas barrier layer formation are applied thereto through a die 13 and a die 15, respectively, and the resulting coatings are dried or cured optionally with heating, light irradiation, etc., to give coating films 16 and 17. In this embodiment, the apparatus is equipped with a heater 9 and a UV curing device 14.

The endless belt 7 has recesses and protrusions. The endless belt 7 preferably has a surface roughness (Ra) of from 80 to 500 nm and a peak-to-valley distance of from 20 to 80 µm.

A hard coat layer containing transparent particles can be formed by incorporating transparent particles into the resin solution for hard coat layer formation and applying and drying the solution.

Subsequently, a liquid containing a resin for base layer formation is applied in a sheet form to the coating films 16 and 17 through a die 8. The resulting coating is completely cured by heating or light irradiation to form a coating film 12. In this embodiment, the apparatus is equipped with a heater 9. Heating may be conducted with hot air, an infrared heater, or the like or a combination of two or more of these. In the case of hot-air drying, the wind velocity is generally from 0.1 to 5 m/sec, but is preferably from 0.2 to 1 m/sec in the heating of a liquid containing a thermoplastic or thermosetting resin.

The heater 9 preferably has about ten zones so as to control viscosity changes, i.e., the viscosity decrease due to the temperature dependence of the resin-containing liquid and the viscosity increase due to a curing reaction. In each zone, the coating can be heated from the upper or lower side of the endless belt or from both sides. The heating temperature is preferably from 30 to 250° C. The accuracy of heating temperature is preferably within ±0.5° C./cm, more preferably within ±0.1° C/cm. If the heating temperature is lower than 30° C., the resin for base layer formation is less apt to cure. If the heating temperature exceeds 250° C., the viscosity of the liquid containing a resin for base layer formation becomes so low that the resulting resin sheet has an impaired thickness precision. Furthermore, if the accuracy of heating temperature is outside the range of ±0.5° C./cm, the resulting resin sheet tends to have an impaired thickness precision and an appearance failure.

The die 8 through which the liquid containing a resin for base layer formation is ejected has a temperature of preferably from 10 to 40° C., more preferably from 20 to 30° C., and has a temperature accuracy of preferably within ±0.5° C., more preferably within ±0.1° C. If the temperature of the die is lower than 10° C., the liquid containing a resin for base layer formation has an increased viscosity, resulting in a problem concerning application. If the temperature thereof exceeds 40° C., the resin for base layer formation begins to cure within the die, making the application difficult. Furthermore, if the accuracy of the die temperature is outside the range of ±0.5° C., the resulting resin sheet tends to have an impaired thickness precision and an appearance failure.

The viscosity of the liquid containing a resin for base layer formation to be ejected is preferably from 0.1 to 50 Pa·s. For extrusion coating, the viscosity thereof is preferably from 15 to 30 Pa·s. If the viscosity of the resin-containing liquid is lower than 0.1 Pa·s, the resulting resin sheet has an impaired thickness precision. If the viscosity of the resin-containing liquid exceeds 50 Pa·s, the liquid has poor applicability.

Preferred examples of methods for applying the liquid containing a resin for base layer formation include curtain coating, extrusion coating, and roll coating. Especially preferred is extrusion coating.

The heater has guide rolls on the back side of the endless belt so that the horizontal level of the belt can be regulated with a horizontal-level sensor. The horizontal level of the substrate is preferably not higher than 1 mm/[5×(effective width)] mm, more preferably not higher than 1 mm/[40× (effective width)] mm. If the horizontal level thereof is higher than 1 mm/[5×(effective width)] mm, the resulting resin sheet has an impaired thickness precision.

A resin sheet having two hard coat layers can be obtained by the flow casting method. Specifically, a liquid containing a resin for hard coat layer formation is applied to the outermost layer located on the side opposite the endless belt and the resulting coating is dried or cured optionally with heating, light irradiation, etc., whereby the desired resin sheet can be obtained. In this case, the multilayer structure composed of a first hard coat layer, a gas barrier layer, and a base layer can be peeled from the endless belt 1 before a second hard coat layer is formed by spin coating or coating with a single-die coater or the like. It is also possible to form a hard coat layer containing transparent particles by incorporating transparent particles into the resin solution for hard coat layer formation.

A dam for flow prevention may be formed along each edge of the substrate. A heat-resistant resin can be used as a material for the dam. Preferred examples thereof include poly (ethylene terephthalate).

For recovering the resin sheet from the substrate, a means for peeling can be used if desired. From the standpoint of cracking prevention, etc., this recovery is preferably conducted at high temperature, e.g., at a temperature not lower than the glass transition points of the resins. The continuous resin sheet thus formed may be recovered after having been cut into an appropriate size with a suitable cutting means, e.g., a laser beam, ultrasonic cutter, dicing, or water jet. According to the flow casting method described above, the rate of production can be easily controlled by regulating the traveling speed of the spread layers through the support. The thickness of the resin sheet to be obtained also can be easily controlled by regulating the traveling speed of the spread layers and the spread amounts thereof.

In the case where a resin sheet of the invention is used as a viewing-side substrate to fabricate a liquid crystal display, it should be disposed so that the viewing-side outermost surface is that surface of the resin sheet which has recesses and protrusions. Namely, a polarizing film cannot be disposed on the viewing side of the resin sheet. Because of this, the liquid crystals usable in this display are limited to those which do not utilize a polarized light, such as cholesteric liquid crystals and polymer dispersion type liquid crystals. Use of a resin sheet colored black as a substrate disposed opposite to the viewing side is effective in preventing the light which has passed through the liquid crystal layer from being reflected to generate an inversion light and in thereby improving a display contrast.

One of the resin sheets according to the second aspect of the invention comprises a gas barrier layer, a base layer, and two hard coat layers respectively as the outermost layers, wherein at least one of the hard coat layers contains transparent particles.

Figure 5:
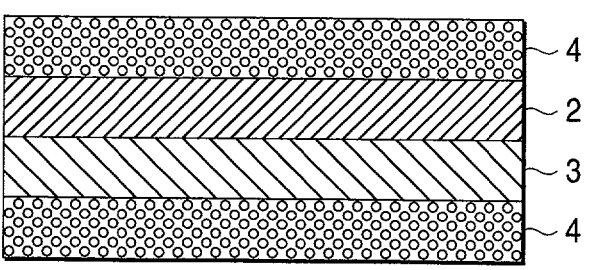
FIG. 5 is a diagrammatic sectional view of still a further embodiment of the resin sheets according to the invention.
Figure 6:
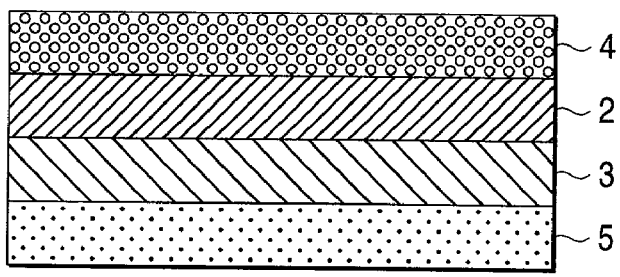
FIG. 6 is a diagrammatic sectional view of still a further embodiment of the resin sheets according to the invention.

In this resin sheet, the sequence of superposition of the base layer and gas barrier layer is not particularly limited. Namely, this resin sheet provided by the second aspect of the invention can be one comprising, from an outermost side, a hard coat layer, a gas barrier layer, a base layer, and a hard coat layer, or one comprising, from an outermost side, a hard coat layer, a base layer, a gas barrier layer, and a hard coat layer. Embodiments of the resin sheet described above are shown in FIGS. 5 and 6.

The other of the resin sheets according to the second aspect of the invention comprises a gas barrier layer, a base layer, and one hard coat layer as an outermost layer, wherein the hard coat layer contains transparent particles.

Figure 7:
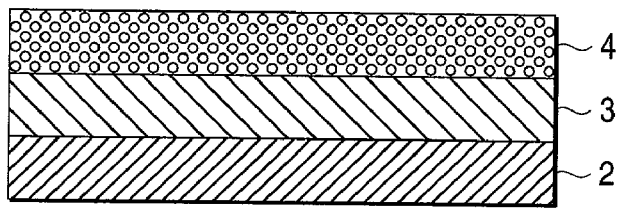
FIG. 7 is a diagrammatic sectional view of still a further embodiment of the resin sheets according to the invention.

In this resin sheet also, the sequence of superposition of the base layer and gas barrier layer is not particularly limited. Namely, this resin sheet according to the second aspect of the invention can be one comprising, from an outermost side, a hard coat layer, a gas barrier layer, and a base layer, or one comprising, from an outermost side, a hard coat layer, a base layer, and a gas barrier layer. It is, however, preferred that the gas barrier layer be not an outermost layer, because the gas barrier layer may be inferior to the hard coat layer and base layer in impact resistance and chemical resistance. Namely, the resin sheet comprising, from an outermost side, a hard coat layer, a gas barrier layer, and a base layer is more preferred. One embodiment of the resin sheet described above is shown in FIG. 7.

In this aspect of the invention, when the hard coat layer as an outermost layer contains transparent particles, a light-diffusing function is imparted to the resin sheet. Examples of the transparent particles for use in this invention include particles of inorganic materials such as glasses and silica and particles of organic materials such as acrylic resins, polyester resins, epoxy resins, melamine resins, urethane resins, polycarbonate resins, polystyrene resins, silicone resins, benzoguanamine resins, melamine/benzoguanamine condensates, and benzoguanamine/formaldehyde condensates. Preferred are spherical particles having such a refractive index that the difference in refractive index between the spherical particles and the matrix resin constituting the hard coat layer is in the range of from 0.03 to 0.10. If the difference in refractive index between the spherical particles and the matrix resin is smaller than 0.03 or larger than 0.10, a sufficient light-diffusing function cannot be imparted.

The transparent particles preferably have a particle diameter of from 0.5 to 30 µm. Particle diameters thereof smaller than 0.5 µm are undesirable in that the result is insufficient light diffusion, while particle diameters thereof larger than 30 µm are undesirable in that the result is uneven light diffusion.

The proportion of the transparent particles to the hard coat layer is preferably from 1 to 50% by volume. This proportion by volume can be defined as [(volume of the transparent particles)/(volume of the hard coat layer)]×100. The "volume of the hard coat layer" herein means the volume of the hard coat layer including the transparent particles. If the proportion of the transparent particles to the hard coat layer is lower than 1% or higher than 50%, a sufficient light-diffusing function cannot be imparted.

In this aspect of the invention, the base layer preferably comprises an epoxy resin such as those described above, and the hard coat layers preferably comprise the urethane resin described above.

In this aspect of the invention, when a resin solution for hard coat layer formation which contains transparent particles is applied and then dried, a hard coat layer containing transparent particles can be formed.

In the casting method, a resin solution for hard coat layer formation is applied to two casting plates having an even surface, and the solution applied is dried to form hard coat layers. Subsequently, a liquid containing a resin for gas barrier layer formation is applied to either of the two casting plates and then dried to form a gas barrier layer. These two casting plates are assembled through a spacer and a sealing material so that the resin-coated sides face each other. Subsequently, a liquid containing a resin for base layer formation is injected into the space between the casting plates and cured to form a base layer. The resulting multilayer resin structure is peeled from the two casting plates. Thus, a resin sheet according to this aspect of the invention can be obtained. In this case, a hard coat layer containing transparent particles can be formed by incorporating transparent particles into a resin solution for hard coat layer formation and applying and drying the solution.

The resin sheet having a light-diffusing function according to this aspect of the invention can be produced also by the flow casting method. In this case, the endless belt for flow casting preferably has an even surface.

A liquid crystal display is generally fabricated, for example, by suitably assembling components including a polarizing film, a liquid crystal cell, a reflector or backlight, and optional optical parts and integrating an operating circuit into the assembly. In the invention, a liquid crystal display can be fabricated according to such a conventional procedure without particular limitations, except that the resin sheet described above is used. Consequently, appropriate optical parts can be suitably used in combination with the resin sheet described above. For example, a light diffuser plate, antiglare layer, antireflection film, protective layer, or protective plate may be disposed over a viewing-side polarizing film. Furthermore, a retardation film for compensation may be interposed between the liquid crystal cell and the viewing-side polarizing film.

For the purpose of improving visibility, the resin sheet in the invention is preferably disposed on the viewing side of the liquid crystal cell so that the hard coat layer containing transparent particles is located nearest to the liquid crystal layer.

The resin sheet according to the third aspect of the invention comprises a gas barrier layer, a base layer, and one hard coat layer as an outermost layer, wherein the hard coat layer has recesses and protrusions on the outer surface thereof.

Figure 9:
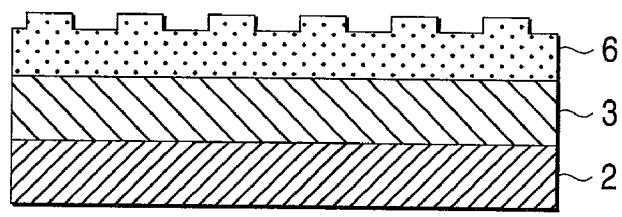
FIG. 9 is a diagrammatic sectional view of still a further embodiment of the resin sheets according to the invention.

In this resin sheet, the sequence of superposition of the base layer and gas barrier layer is not particularly limited. Namely, the resin sheet according to the third aspect of the invention can be one comprising, from an outermost side, a hard coat layer, a gas barrier layer, and a base layer, or one comprising, from an outermost side, a hard coat layer, a base layer, and a gas barrier layer. It is, however, preferred that the gas barrier layer be not an outermost layer, because the gas barrier layer may be inferior to the hard coat layer and base layer in impact resistance and chemical resistance. Namely, the resin sheet comprising, from an outermost side, a hard coat layer, a gas barrier layer, and a base layer is more preferred. One embodiment of the resin sheet described above is shown in FIG. 9.

Figure 8:
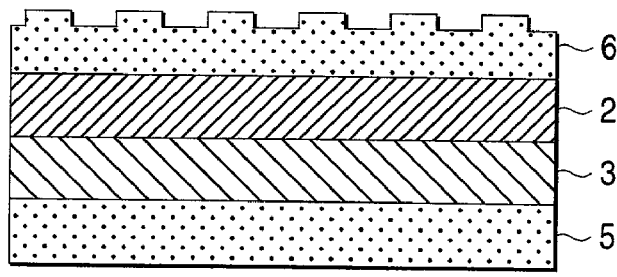
FIG. 8 is a diagrammatic sectional view of still a further embodiment of the resin sheets according to the invention.

Another hard coat layer may be superposed as the other outermost layer. This second hard coat layer has no recesses and protrusions. Namely, this resin sheet provided by the third aspect of the invention can be one comprising, from an outermost side, a hard coat layer, a gas barrier layer, a base layer, and a hard coat layer, or one comprising, from an outermost side, a hard coat layer, a base layer, a gas barrier layer, and a hard coat layer. In this case, the sequence of superposition of the base layer and gas barrier layer is not particularly limited. An embodiment of the resin sheet described above is shown in FIG. 8.

In this aspect of the invention, when a hard coat layer has recesses and protrusions, an antiglare function is imparted to the resin sheet. The hard coat layer having recesses and protrusions in this aspect of the invention preferably has a surface roughness (Ra) of from 80 to 500 nm. If the surface roughness (Ra) of the hard coat layer having recesses and protrusions is lower than 80 nm or higher than 500 nm, a sufficient antiglare function cannot be imparted. The term "surface roughness" as used herein means the "arithmetic mean roughness Ra" as provided for in JIS B 0601.

The hard coat layer having recesses and protrusions in this aspect of the invention preferably has a peak-to-valley distance of from 20 to 80 µm. If the peak-to-valley distance of the hard coat layer is smaller than 20 µm or larger than 80 µm, a sufficient antiglare function cannot be imparted. The term "peak-to-valley distance" as used herein means the "mean distance between recesses and protrusions Sm" as provided for in JIS B 0601.

In this aspect of the invention, the base layer preferably comprises an epoxy resin such as those described above, and the hard coat layers preferably comprise the urethane resin described above.

A process for producing the resin sheets according to this aspect of the invention includes the step of transferring the shape of recesses formed in a support to thereby form recesses and protrusions on a surface of a hard coat layer.

The support is usually in the form of a belt or plate. Examples thereof include an endless belt for flow casting and a flat molding plate for casting.

In order for the support to give a hard coat layer having recesses and protrusions, the support preferably has a surface roughness (Ra) of from 80 to 500 nm and a peak-to-valley distance of from 20 to 80 µm.

In the flow casting method, a resin solution for hard-coat layer formation is applied to a support having recesses and protrusions and then dried to form a hard coat layer. Thereon are superposed a gas barrier layer and a base layer. The resulting multilayer structure is peeled from the support to thereby obtain a resin sheet in which the hard coat layer has recesses and protrusions formed thereon.

When another hard coat layer is formed on that multilayer structure on the side opposite to the support side, then a resin sheet having two hard coat layers is obtained. In this case, the hard coat layer thus formed has no recesses and protrusions.

In the casting method, a resin solution for hard coat layer formation is first applied to a casting plate having a surface with recesses and protrusions and to a casting plate having an even surface, and the solution applied is dried to form hard coat layers. Subsequently, a liquid containing a resin for gas barrier layer formation is applied to either of the two casting plates and then dried to form a gas barrier layer. These two casting plates are assembled through a spacer and a sealing material so that the resin-coated sides face each other. Subsequently, a liquid containing a resin for base layer formation is injected into the space between the casting plates and cured to form a base layer. The resulting multilayer resin structure is peeled from the two casting plates. Thus, a resin sheet can be obtained in which one of the hard coat layers has recesses and protrusions formed by the transfer of the shape of recesses formed in one of the supports.

The casting plate having recesses and protrusions for use in the casting method also preferably has a surface roughness (Ra) of from 80 to 500 nm and a peak-to-valley distance of from 20 to 80 µm.

In the case where a resin sheet of the invention is used as a viewing-side substrate to fabricate a liquid crystal display, it should be disposed so that the viewing-side outermost surface is that surface of the resin sheet which has recesses and protrusions. Namely, a polarizing film cannot be disposed on the viewing side of the resin sheet. Because of this, the liquid crystals usable in this display are limited to those which do not utilize a polarized light, such as cholesteric liquid crystals and polymer dispersion type liquid crystals. Use of a resin sheet colored black as a substrate disposed opposite to the viewing side is effective in preventing the light which has passed through the liquid crystal layer from being reflected to generate an inversion light and in thereby improving a display contrast.

Applications of the resin sheets of the invention are not limited to liquid crystal cell substrates, and the resin sheets can be advantageously used also as substrates for electroluminescent elements. Use of the resin sheets of the invention as substrates for electroluminescent elements is effective in diffusing or reflecting external light to thereby improve display quality.

Applications of the resin sheet of the invention are not limited to liquid-crystal cell substrates, and the resin sheet can be advantageously used also as a substrate for organic electroluminescent displays.

In general, an organic electroluminescent device comprises a luminescent unit (organic electroluminescent unit) constituted of a transparent substrate and, superposed thereon in this order, a transparent electrode, an organic luminescent layer, and a metal electrode. The organic luminescent layer has a multilayer structure composed of thin organic films selected from various kinds, and various combinations of organic films are known. Examples thereof include a multilayer structure comprising a hole injection layer comprising a triphenylamine derivative and a luminescent layer comprising a fluorescent organic solid such as anthracene, a multilayer structure comprising such a luminescent layer and an electron injection layer comprising a perylene derivative, and a multilayer structure comprising such hole injection, luminescent, and electron injection layers.

The organic electroluminescent device luminesces based on the following principle. A voltage is applied between the transparent electrode and the metal electrode to thereby inject holes and electrons into the organic luminescent layer. The holes recombine with the electrons to generate an energy, which excites the fluorescent substance. This excited fluorescent substance emits a light upon recovery to the ground state. The mechanism of the recombination occurring during the luminescent process is the same as in general diodes. As can be presumed from this, the current and the luminescent intensity are highly nonlinear to the applied voltage, and the luminescence is accompanied by rectification.

In the organic electroluminescent device, at least one of the electrodes should be transparent in order to take out the light emitted by the organic luminescent layer. Usually, a transparent electrode made of a transparent conductor, e.g., indium-tin oxide (ITO), is used as the anode. On the other hand, for facilitating electron injection so as to heighten the luminous efficiency, it is important to use as the cathode a substance having a small work function. Usually, a metallic electrode made of, e.g., Mg—Ag or Al—Li is used.

The organic luminescent layer in the organic electroluminescent device having such a constitution is an exceedingly thin film having a thickness of about 10 nm. The organic luminescent layer hence transmits light almost completely like the transparent electrode. Because of this, a light incident on the device in the nonluminescent mode from the transparent-substrate side passes through the transparent electrode and the organic luminescent layer, is reflected by the metal electrode, and then reaches the front-side surface of the transparent substrate again. As a result, the display side of the organic electroluminescent device, when viewed from the outside, appears to be a mirror surface.

Such an organic electroluminescent device, which comprises an organic electroluminescent unit comprising an organic luminescent layer which luminesces upon voltage application, a transparent electrode disposed on the front side of the organic luminescent layer, and a metal electrode disposed on the back side of the organic luminescent layer, can be made to have a constitution including a polarizing film disposed on the front side of the transparent electrode and a retardation film interposed between the transparent electrode and the polarizing film.

The retardation film and the polarizing film function to polarize a light which has entered the device from the outside and has been reflected by the metal electrode. These films hence have the effect of preventing, based on the polarizing function, the mirror surface of the metal electrode from being perceived from the outside. In particular, when the retardation film is constituted of a quarter wavelength plate and the angle between the direction of polarization for the polarizing film and that for the retardation film is regulated to $\pi/4$, then the mirror surface of the metal electrode can be made completely invisible.

Specifically, when an external light strikes on this organic electroluminescent device, the polarizing film permits only the linearly polarized component of the light to pass therethrough. Although this linearly polarized light is generally converted to an elliptically polarized light by the retardation film, it is converted to a circularly polarized light when the retardation film is a quarter wavelength plate and the angle between the direction of polarization for the polarizing film and that for the retardation film is $\pi/4$.

This circularly polarized light passes through the transparent substrate, transparent electrode, and thin organic film, is reflected by the metal electrode, subsequently passes again through the thin organic film, transparent electrode, and transparent substrate, and is then reconverted to a linearly polarized light by the retardation film. Since this linearly polarized light has a direction of polarization which is perpendicular to that for the polarizing film, it cannot pass through the polarizing film. As a result, the mirror surface of the metal electrode can be made completely invisible.

The invention will be explained below in more detail by reference to the following Examples, but the invention should not be construed as being limited to these Examples in any way. Hereinafter, all "parts" are by weight unless otherwise indicated.

EXAMPLE 1

450 Parts of toluene was added to a mixture of 100 parts of UV-curable resin NK Oligo UN-01 (manufactured by Shin-Nakamura Chemical Co., Ltd.; solid content, 85%), 3 parts of Irgacure #184 (manufactured by Ciba Specialty Chemicals), and 28 parts of synthetic silica particles having an average particle diameter of 1.8 µm. The resulting mixture was homogenized by stirring to obtain a resin solution for forming a transparent resin-containing hard coat layer. This resin solution had a solid concentration of 20%.

450 Parts of toluene was added to a mixture of 100 parts of UV-curable resin NK Oligo UN-01 (manufactured by Shin-Nakamura Chemical Co., Ltd.; solid content, 85%) and 3 parts of Irgacure #184 (manufactured by Ciba Specialty Chemicals). The resulting mixture was homogenized by stirring to obtain a resin solution for hard coat layer formation which had a solid concentration of 16%.

To 400 parts of 3,4-epoxycyclohexylmethyl 3,4-epoxycyclohexanecarboxylate, represented by the following formula (1), were added 500 parts of methylhexahydrophthalic anhydride, represented by the following formula (2), 15 parts of tetra-n-butylphosphonium o,o-diethyl phosphorodithioate, represented by the following formula (3), 9 parts of glycerol, and 1 part of a surfactant. The resulting mixture was homogenized by stirring to obtain a liquid containing a resin for base layer formation.

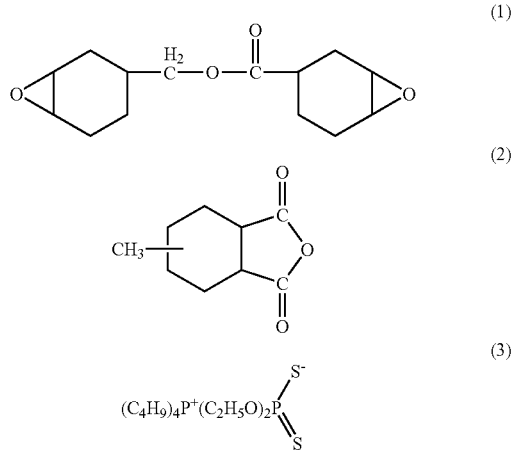

Subsequently, a resin sheet was produced by the casting method using the casting plates shown in FIG. 11. The method for production used is explained below by reference to FIG. 11.

Figure 11:
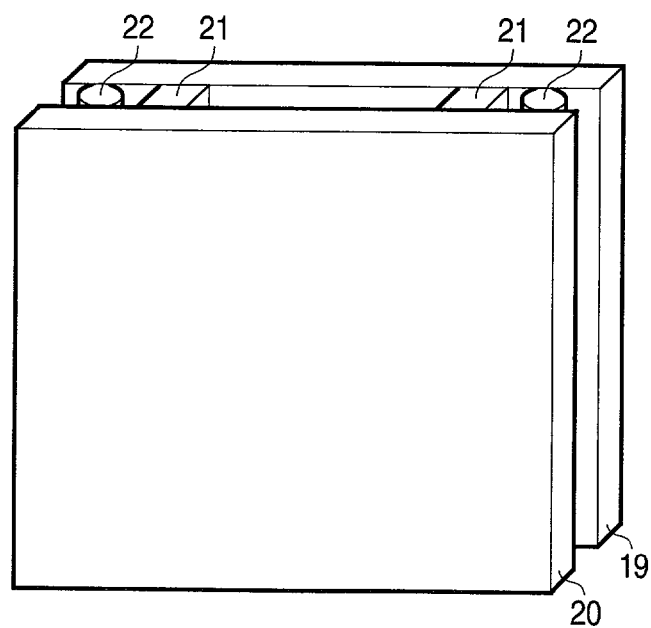
FIG. 11 is a slant view for illustrating a process for producing a resin sheet by the casting method.
Figure 12:
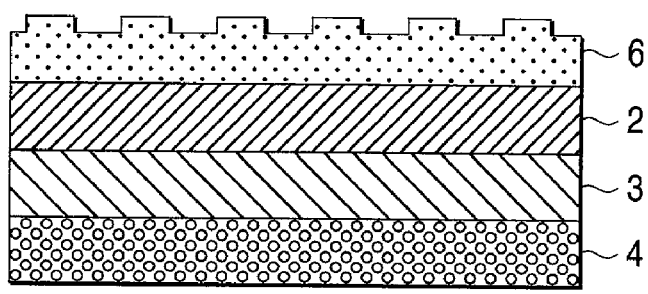
FIG. 12 is a diagrammatic sectional view of resin sheet (a).
Figure 13:
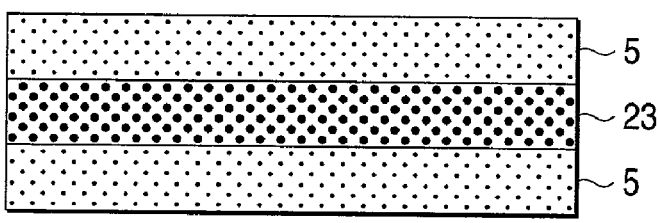
FIG. 13 is a diagrammatic sectional view of resin sheet (b).
Figure 14:
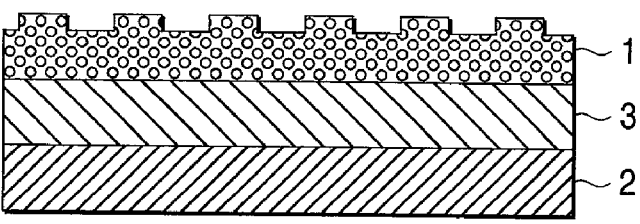
FIG. 14 is a diagrammatic sectional view of resin sheet (c).
Figure 15:
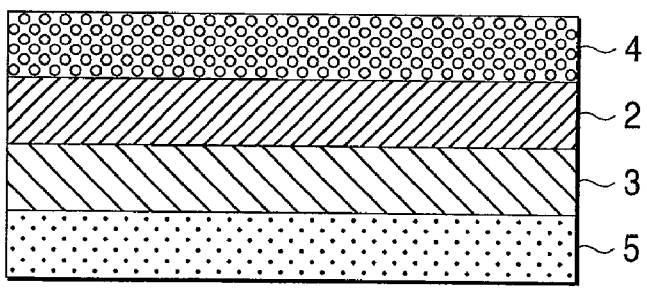
FIG. 15 is a diagrammatic sectional view of resin sheet (d).
Figure 16:
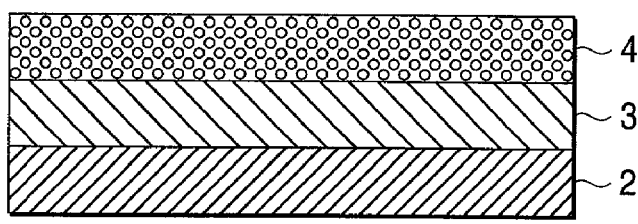
FIG. 16 is a diagrammatic sectional view of resin sheet (e).
Figure 17:
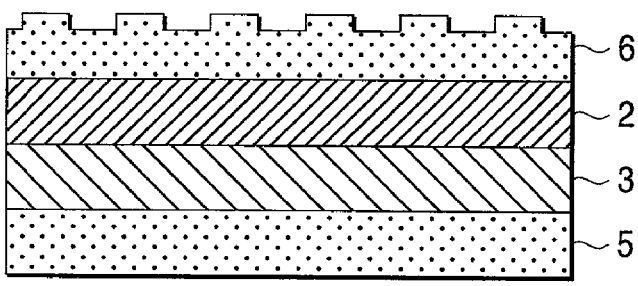
FIG. 17 is a diagrammatic sectional view of resin sheet (f).
Figure 18:
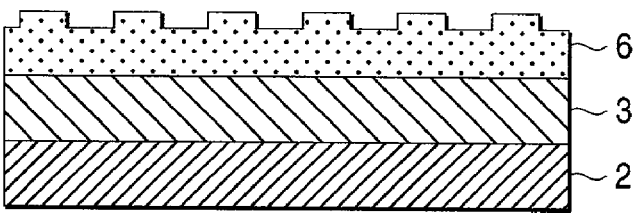
FIG. 18 is a diagrammatic sectional view of resin sheet (g).
Figure 19:
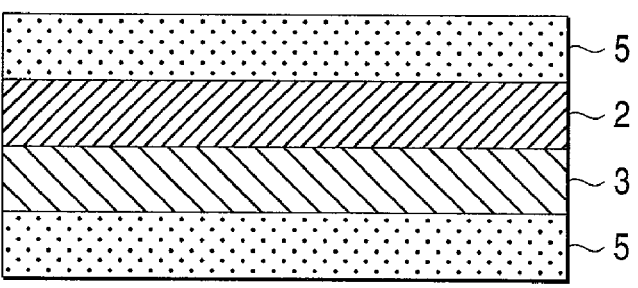
FIG. 19 is a diagrammatic sectional view of resin sheet

One of the casting plates shown in FIG. 11 was an even surface casting plate 19 having dimensions of 450 mm×450 mm and a surface roughness Ra of 5 nm, and the other was a surface-processed casting plate 20 which had dimensions of 450 mm×450 mm and had undergone a surface processing so as to have a surface roughness Ra of 100 nm and a peak-to-valley distance of 45 µm. First, the resin solution for forming a transparent particle-containing hard coat layer was applied by spin coating to the even surface casting plate 19 and then dried to remove the toluene. The resulting coating was irradiated with ultraviolet (center wavelength, 254 nm; integrated quantity of light, 2,000 mJ/cm$^2$) to form a hard coat layer containing transparent particles and having a thickness of 2 µm. Subsequently, the resin solution for hard coat layer formation was applied by spin coating to the processed side of the surface-processed casting plate 20 and then dried to remove the toluene. The resulting coating was irradiated with ultraviolet (center wavelength, 254 nm; integrated quantity of light, 2,000 mJ/cm$^2$) to form a hard coat layer which, excluding the protrusions thereof, had a thickness of 2 µm.

Thereafter, a 5.5% by weight aqueous solution of poly(vinyl alcohol) was applied by spin coating to the hard coat layer formed on the even surface casting plate 19, and then dried and cured to form a gas barrier layer having a thickness of 3.7 µm.

A casting mold was fabricated by assembling the two casting plates through a spacer for gap regulation and a sealing material in the manner shown in FIG. 11 so that the respective resin-coated sides faced each other and the space between the plates had a width of 400 µm.

Into the space between the two casting plates was injected the liquid prepared above containing a resin for base layer formation. The resin-containing liquid was cured by heating at 120° C. for 30 minutes and then at 180° C. for 1 hour.

Thereafter, the two casting plates were disassembled and the resulting resin layer was peeled from the plates to obtain a resin sheet (a).

In the resin sheet (a) obtained, the side to which the shape of the recesses and protrusions of the casting plate 20 had been transferred had a surface roughness Ra of 100 nm and a peak-to-valley distance of 45 µm, and the other side had a surface roughness Ra of 5 nm. The resin sheet (a) had an average thickness of 400 µm and a standard deviation in thickness of 9 µm.

Another resin sheet was produced in the following manner. This resin sheet was one to be used in combination with the resin sheet (a) for interposing a liquid crystal therebetween. First, the resin solution for hard coat layer formation was applied to two even surface casting plates and dried to form hard coat layers. Subsequently, a casting mold was fabricated by assembling the two casting plates through a spacer for gap regulation and a sealing material in the manner shown in FIG. 11 so that the respective resin-coated sides faced each other and the space between the casting plates had a width of 400 µm.

Black pigment Mitsubishi Carbon Black MA100 was dispersed into the liquid containing a resin for base layer formation in a resin-containing liquid/MA100 ratio of 10/1 by weight. This pigmented liquid for base layer formation was injected into the space between the two casting plates and then cured by heating at 120° C. for 30 minutes and then at 180° C. for 1 hour. The resulting resin sheet (b) was taken out of the mold.

The resin sheet (b) obtained had a surface roughness Ra of 4 nm on each side, and had an average thickness of 400 µm and a standard deviation in thickness of 8 µm.

The resin sheets (a) and (b) obtained were cut into a given shape and then treated with a plasma in an argon atmosphere. On the resin sheets thus treated was deposited a thin film of indium-tin oxide (ITO) by sputtering. Thus, transparent substrates for liquid crystals were produced.

The ITO film deposition was conducted on that side of the resin sheet (a) which had no recesses and protrusions and on either side of the resin sheet (b).

Thereafter, the ITO thin film of the resin sheet (a) was divided into two parts. The resin sheets (a) and (b) were disposed face to face through a spacer for gap regulation comprising spherical glass beads so that the respective ITO thin films faced each other and the respective directions of rubbing were perpendicular to each other. The resin sheets (a) and (b) thus disposed were fixed with a sealing material. Subsequently, a solution prepared by homogeneously mixing 10 parts of trimethylpropane triacrylate (TMPTA) with 10 parts of 2-hydroxyethyl acrylate (HEA), 25 parts of an acrylic oligomer ("M-1200", manufactured by Toagosei Chemical Industry Co., Ltd.), 0.5 parts of photocuring initiator "Durocure-1173" manufactured by Merck, and 50 parts of liquid crystal "E7" manufactured by BDH was injected into the space between the resin sheets (a) and (b). This resin sheet assemblage was irradiated with ultraviolet from the resin sheet (a) side to thereby produce a liquid crystal cell.

EXAMPLE 2

A resin sheet was produced by the flow casting method using the apparatus shown in FIG. 10. First, the resin solution for forming a transparent particle-containing hard coat layer prepared in Example 1 was ejected from the die 13 and flow cast on the stainless steel endless belt 7 (surface roughness Ra, 100 nm; peak-to-valley distance, 40 µm) at a belt running speed of 0.2 m/min. After the toluene was volatilized, the coating was cured with the UV curing device 14 (center wavelength, 254 nm; integrated quantity of light, 2,000 mJ/cm$^2$) to obtain a hard coat layer containing transparent particles and having a thickness of 5 µm and a width of 500 mm.

Subsequently, a 5.5% by weight aqueous solution of poly(vinyl alcohol) was ejected from the die 15 and flow cast on the hard coat layer. The coating was dried with heating (60° C.×10 min) to obtain a gas barrier layer having a thickness of 4 µm and a width of 450 mm.

A heat-resistant PET base tape having a width of 40 mm (MT-3155, manufactured by Nitto Denko Corp.) was applied to each edge of the resulting two-layer structure composed of the hard coat layer and gas barrier layer. The liquid containing a resin for base layer formation described above (20 Pa·s, 25° C.) was ejected from the die 8 and flow cast on the resin layer at a width of 430 mm. The coating was dried by heating with the heater 9 at 90° C. for 5 minutes, subsequently at 120° C. for 5 minutes, and then at 140° C. for 15 minutes. On the drum 11 kept at 130° C., the resulting multilayered coating was peeled from the stainless steel endless belt at the interface between the belt and the hard coat layer. Thus, a resin sheet (c) having a width of 430 mm was obtained. In the coating operation, the support in the heater was regulated so as to have a horizontal level of 200 µm/1,000 mm, and the coating was dried with hot air from the upper and lower sides of the support, the accuracy of heating temperature being 0.4° C./cm.

The resin sheet (c) obtained was cut perpendicularly to the machine direction at intervals of 490 mm to obtain cut pieces of 490 mm by 490 mm. The resin sheet (c) obtained had an average thickness of 400 µm and a standard deviation in thickness of 7 µm.

The values of average thickness and standard deviation in thickness were obtained from the found thickness values for sixty points within an area of 480 mm by 480 mm.

The resin sheet (c) had surface roughnesses Ra of 0.2 nm on the base layer side and 100 nm on the hard coat layer side. The surface of the hard coat layer had a peak-to-valley distance of 40 µm. Each value of surface roughness is the average of the found values for ten points within an area of 480 mm by 480 mm.

Subsequently, an ITO thin film was deposited on the base layer side of the resin sheet (c). This resin sheet was used in combination with a resin sheet (b) in the same manner as in Example 1 to produce a liquid crystal cell.

EXAMPLE 3

A resin solution for forming a transparent resin-containing hard coat layer, a resin solution for hard coat layer formation, and a liquid containing a resin for base layer formation were obtained in the same manner as in Example 1. Subsequently, a resin sheet was produced by the casting method in the following manner.

Two casting plates were used, which each were an even surface casting plate having dimensions of 450 mm×450 mm and a surface roughness Ra of 5 nm. First, the resin solution for forming a transparent particle-containing hard coat layer was applied by spin coating to one of the even surface casting plates and then dried to remove the toluene. The resulting coating was irradiated with ultraviolet (center wavelength, 254 nm; integrated quantity of light, 2,000 mJ/cm$^2$) to form a hard coat layer containing transparent particles and having a thickness of 2 µm. Subsequently, the resin solution for hard coat layer formation was applied by spin coating to the other even surface casting plate and then dried to remove the toluene. The resulting coating was irradiated with ultraviolet (center wavelength, 254 nm; integrated quantity of light, 2,000 mJ/cm$^2$) to form a hard coat layer having a thickness of 2 µm.

Thereafter, a 5.5% by weight aqueous solution of poly(vinyl alcohol) was applied by spin coating to the hard coat layer not containing transparent particles, and then dried and cured to form a gas barrier layer having a thickness of 3.7 µm.

A casting mold was fabricated by assembling the two casting plates through a spacer for gap regulation and a sealing material so that the respective resin-coated sides faced each other and the space between the plates had a width of 400 µm.

Into the space between the two casting plates was injected the liquid prepared above containing a resin for base layer formation. The resin-containing liquid was cured by heating at 120° C. for 30 minutes and then at 180° C. for 1 hour.

Thereafter, the two casting plates were disassembled and the resulting resin layer was peeled from the plates to obtain a resin sheet (d).

The resin sheet (d) obtained had a surface roughness Ra of 5 nm. The resin sheet (d) had an average thickness of 400 µm and a standard deviation in thickness of 9 µm.

A resin sheet (b) was produced in the same manner as in Example 1. The resin sheets (d) and (b) obtained were cut into a given shape and then treated with a plasma in an argon atmosphere. On the resin sheets thus treated was deposited a thin film of indium-tin oxide (ITO) by sputtering.

The ITO film deposition was conducted on the transparent particle-containing hard coat layer of the resin sheet (d) and on the hard coat layer on either side of the resin sheet (b).

Thereafter, the ITO thin film of the resin sheet (d) was divided into two parts. Those two substrates as a pair were disposed face to face through a spacer for gap regulation comprising spherical glass beads so that the respective ITO thin films faced each other and the respective directions of rubbing were perpendicular to each other. The resin sheets (d) and (b) thus disposed were fixed with a sealing material. Subsequently, a solution prepared by homogeneously mixing 10 parts of trimethylpropane triacrylate (TMPTA) with 10 parts of 2-hydroxyethylacrylate (HEA), 25 parts of an acrylic oligomer ("M-1200", manufactured by Toagosei Co., Ltd.), 0.5 parts of photocuring initiator "Durocure-1173" manufactured by Merck, and 50 parts of liquid crystal "E7" manufactured by BDH was injected into the space between the resin sheets (d) and (b). This resin sheet assembly was irradiated with ultraviolet from the resin sheet (d) side to thereby produce a liquid crystal cell.

EXAMPLE 4

A liquid crystal cell substrate was produced by the flow casting method. First, the resin solution for forming a transparent particle-containing hard coat layer prepared in Example 1 was ejected from a die and flow cast on a stainless steel endless belt (surface roughness Ra, 7 nm) at a belt running speed of 0.2 m/min. After the toluene was volatilized, the coating was cured with a UV curing device (center wavelength, 254 nm; integrated quantity of light, 2,000 mJ/cm$^2$) to obtain a hard coat layer containing transparent particles and having a thickness of 5 μm and a width of 500 mm.

Subsequently, a 5.5% by weight aqueous solution of poly(vinyl alcohol) was ejected from a die and flow cast on the hard coat layer. The coating was dried with heating (60° C.×10 min) to obtain a gas barrier layer having a thickness of 4 μm and a width of 450 mm.

A heat-resistant PET base tape having a width of 40 mm (MT-3155, manufactured by Nitto Denko Corporation) was applied to each edge of the resulting two-layer structure composed of the hard coat layer and gas barrier layer. The liquid containing a resin for base layer formation described above (20 Pa·s, 25° C.) was ejected from a die and flow cast on the resin layer at a width of 430 mm. The coating was dried by heating with a heater at 90° C. for 5 minutes, subsequently at 120° C. for 5 minutes, and then at 140° C. for 15 minutes. On a drum kept at 130° C., the resulting multilayered coating was peeled from the stainless steel endless belt at the interface between the belt and the hard coat layer. Thus, a resin sheet (e) having a width of 430 mm was obtained. In the coating operation, the support in the heater was regulated so as to have a horizontal level of 200 μm/1,000 mm, and the coating was dried with hot air from the upper and lower sides of the support, the accuracy of heating temperature being 0.4° C./cm.

The resin sheet (e) obtained was cut perpendicularly to the machine direction at intervals of 490 mm to obtain cut pieces of 490 mm by 490 mm. The resin sheet (e) obtained had an average thickness of 400 μm and a standard deviation in thickness of 7 μm.

The values of average thickness and standard deviation in thickness were obtained from the found thickness values for sixty points within an area of 480 mm by 480 mm.

The resin sheet (e) had surface roughnesses Ra of 0.2 nm on the base layer side and 7 nm on the hard coat layer side. Each value of surface roughness is the average of the found values for ten points within an area of 480 mm by 480 mm.

Subsequently, an ITO thin film was deposited on the hard coat layer side of the resin sheet (e). This resin sheet was used in combination with a resin sheet (b) in the same manner as in Example 3 to produce a liquid crystal cell.

EXAMPLE 5

A resin solution for hard coat layer formation and a liquid containing a resin for base layer formation were obtained in the same manner as in Example 1. Subsequently, a liquid crystal cell substrate was produced by the casting method in the following manner.

Two casting plates were used, of which one was an even surface casting plate having dimensions of 450 mm×450 mm and a surface roughness Ra of 5 nm and the other was a surface-processed casting plate which had dimensions of 450 mm×450 mm and had undergone a surface processing so as to have a surface roughness Ra of 100 nm and a peak-to-valley distance of 30 μm. First, the resin solution for hard coat layer formation was applied by spin coating to the even surface casting plate and then dried to remove the toluene. The resulting coating was irradiated with ultraviolet (center wavelength, 254 nm; integrated quantity of light, 2,000 mJ/cm$^2$) to form a hard coat layer having a thickness of 2 μm. Subsequently, the resin solution for hard coat layer formation was applied by spin coating to the processed side of the surface-processed casting plate and then dried to remove the toluene. The resulting coating was irradiated with ultraviolet (center wavelength, 254 nm; integrated quantity of light, 2,000 mJ/cm$^2$) to form a hard coat layer which, excluding the protrusions thereof, had a thickness of 2 μm.

Thereafter, a 5.5% by weight aqueous solution of poly (vinyl alcohol) was applied by spin coating to the hard coat layer formed on the even surface casting plate, and then dried and cured to form a gas barrier layer having a thickness of 3.7 μm.

A casting mold was fabricated by assembling the two casting plates through a spacer for gap regulation and a sealing material so that the respective resin-coated sides faced each other and the space between the plates had a width of 400 μm.

Into the space between the two casting plates was injected the liquid prepared above containing a resin for base layer formation. The resin-containing liquid was cured by heating at 120° C. for 30 minutes and then at 180° C. for 1 hour.

Thereafter, the two casting plates were disassembled and the resulting resin layer was peeled from the plates to obtain a resin sheet (f).

In the resin sheet (f) obtained, the side to which the shape of the recesses and protrusions of one of the casting plates had been transferred had a surface roughness Ra of 100 nm and a peak-to-valley distance of 30 μm, and the other side had a surface roughness Ra of 5 nm. The resin sheet (f) had an average thickness of 400 μm and a standard deviation in thickness of 9 μm.

A resin sheet (b) was produced in the same manner as in Example 1. The epoxy resin sheets (f) and (b) obtained were cut into a given shape and then treated with a plasma in an argon atmosphere. On the resin sheets thus treated was deposited a thin film of indium-tin oxide (ITO) by sputtering.

The ITO film deposition was conducted on that side of the resin sheet (f) which had no recesses and protrusions and on either side of the resin sheet (b).

Thereafter, the ITO thin film of the resin sheet (f) was divided into two parts. The resin sheets (f) and (b) were disposed face to face through a spacer for gap regulation consisting of spherical glass beads so that the respective ITO thin films faced each other and the respective directions of rubbing were perpendicular to each other. The resin sheets (f) and (b) thus disposed were fixed with a sealing material.

Subsequently, a solution prepared by homogeneously mixing 10 parts of trimethylpropane triacrylate (TMPTA) with 10 parts of 2-hydroxyethyl acrylate (HEA), 25 parts of an acrylic oligomer ("M-1200" manufactured by Toagosei Co., Ltd.), 0.5 parts of photocuring initiator "Durocure-1173" manufactured by Merck, and 50 parts of liquid crystal "E7" manufactured by BDH was injected into the space between the resin sheets (f) and (b). This resin sheet assembly was irradiated with ultraviolet from the resin sheet (f) side to thereby produce a liquid crystal cell.

EXAMPLE 6

A liquid crystal cell substrate was produced by the flow casting method. First, the resin solution for hard coat layer formation prepared in Example 1 was ejected from a die and flow cast on a stainless steel endless belt (surface roughness Ra, 100 nm; peak-to-valley distance, 30 μm) at a belt running speed of 0.2 m/min. After the toluene was volatilized, the coating was cured with a UV curing device (center wavelength, 254 nm; integrated quantity of light, 2,000 mJ/cm$^2$) to obtain a hard coat layer having a thickness of 5 μm and a width of 500 mm.

Subsequently, a 5.5% by weight aqueous solution of poly(vinyl alcohol) was ejected from a die and flow cast on the hard coat layer. The coating was dried with heating (60° C.×10 min) to obtain a gas barrier layer having a thickness of 4 μm and a width of 450 mm.

A heat-resistant PET base tape having a width of 40 mm (MT-3155, manufactured by Nitto Denko Corporation) was applied to each edge of the resulting two-layer structure composed of the hard coat layer and gas barrier layer. The liquid containing a resin for base layer formation described above (20 Pa·s, 25° C.) was ejected from a die and flow cast on the resin layer at a width of 430 mm. The coating was dried by heating with a heater at 90° C. for 5 minutes, subsequently at 120° C. for 5 minutes, and then at 140° C. for 15 minutes. On a drum kept at 130° C., the resulting multilayered coating was peeled from the stainless steel endless belt at the interface between the belt and the hard coat layer. Thus, a resin sheet (g) having a width of 430 mm was obtained. In the coating operation, the support in the heater was regulated so as to have a horizontal level of 200 μm/1,000 mm, and the coating was dried with hot air from the upper and lower sides of the support, the accuracy of heating temperature being 0.4° C./cm.

The resin sheet (g) obtained was cut perpendicularly to the machine direction at intervals of 490 mm to obtain cut pieces of 490 mm by 490 mm. The resin sheet (g) obtained had an average thickness of 400 μm and a standard deviation in thickness of 7 μm.

The values of average thickness and standard deviation in thickness were obtained from the found thickness values for sixty points within an area of 480 mm by 480 mm.

The resin sheet (g) had surface roughnesses Ra of 0.2 nm on the base layer side and 100 nm on the hard coat layer side. The surface of the hard coat layer had a peak-to-valley distance of 30 μm. Each value of surface roughness is the average of the found values for ten points within an area of 480 mm by 480 mm.

Subsequently, an ITO thin film was deposited on the base layer side of the resin sheet (g). This resin sheet was used in combination with a resin sheet (b) in the same manner as in Example 5 to produce a liquid crystal cell.

COMPARATIVE EXAMPLE 1

A resin sheet (h) was produced in the same manner as in Example 1, except that the resin solution for hard coat layer formation prepared in Example 1 was applied to two even surface casting plates made of metal. This resin sheet was used in combination with a resin sheet (b) in the same manner as in Example 1 to produce a liquid crystal cell.

EVALUATION TEST

The liquid crystal cells produced in Examples 1 to 6 and Comparative Example 1 were used to fabricate liquid crystal displays. In a dark room, the liquid crystal displays were illuminated with a ring-shaped illuminator at an angle of 20°. Under these conditions, each liquid crystal display was examined for the display quality of a black picture while applying a voltage thereto, and was further examined for the display quality of a white picture while applying no voltage thereto.

The displays employing the liquid crystal cells obtained in Examples 1 to 6 had satisfactory display quality with respect to both the black picture and the white picture. In contrast, in the display employing the liquid crystal cell obtained in Comparative Example 1, the ring-shaped illuminator was reflected on the display bearing black picture. Furthermore, this comparative display bearing the white picture glittered probably due to reflection of the illuminating light on the liquid crystal cell surface.

The invention produces the following effects. Since the resin sheets of the invention are resin-based sheets, they are thinner and more lightweight than glass-based substrates. The resin sheets of the invention which have as an outermost layer a hard coat layer having recesses and protrusions have an antiglare function for preventing the so-called ghost phenomenon in which an illuminating light, such as fluorescent light or sunlight, or part of the surrounding objects, e.g., the keyboarder, is reflected on the display. Furthermore, the resin sheets of the invention which have as an outermost layer a hard coat layer containing transparent particles have a light-diffusing function for preventing the glittering attributable to an illuminating light or to the built-in backlight in the liquid crystal display. This impartation of an antiglare function or light-diffusing function to a resin sheet eliminates the necessity of bonding an antiglare sheet or light-diffusing sheet to the viewing side of a liquid crystal cell. As a result, the thickness and weight of liquid crystal cells can be reduced. When the resin sheets of the invention are used as substrates for electroluminescent elements, external light can be diffused or reflected by the resin sheets to thereby improve display quality.

What is claimed is:

1. A resin sheet comprising a gas barrier layer, a base layer, and two hard coat layers respectively as the outermost layers, wherein:
    one of the hard coat layers has recesses and protrusions on the outer surface thereof;
    at least one of the hard coat layers contains transparent particles;
    the surface having recesses and protrusions has a surface roughness of from 80 to 500 nm;
    the gas barrier layer has a thickness of 2 to 10 μm;
    the hard coat layer having recesses and protrusions has a peak-to-valley distance of from 20 to 80 μm;
    the transparent particles have a particle diameter of from 0.5 to 30 μm; and the hard coat layer containing transparent particles comprises from 1 to 50 vol % of the transparent particles, based on the total volume of the hard coat layer.

2. The resin sheet of claim 1, wherein the transparent particles are spherical particles, the difference in refractive index between the spherical particles and the matrix resin constituting the hard coat layer being from 0.03 to 0.10.

3. The resin sheet of claim 1, wherein the base layer comprises an epoxy resin.

4. The resin sheet of claim 1, wherein the hard coat layers comprise a urethane resin.

5. A process for producing the resin sheet of claim 1 which includes the step of transferring the shape of recesses formed in a support to thereby form recesses and protrusions on a surface of a hard coat layer.

6. A liquid crystal display which uses the resin sheet of claim 1.

7. An organic electroluminescent display which uses the resin sheet of claim 1.

8. A resin sheet comprising a gas barrier layer, a base layer, and one hard coat layer as an outermost layer, wherein:
   the hard coat layer has recesses and protrusions on the outer surface thereof and contains transparent particles;
   the gas barrier layer has a thickness of 2 to 10 μm;
   the hard coat layer has a peak-to-valley distance of from 20 to 80 μm;
   the transparent particles have a particle diameter of from 0.5 to 30 μm; and
   the hard coat layer comprises from 1 to 50 vol % of the transparent particles, based on the total volume of the hard coat layer.

* * * * *